US012770283B2

(12) United States Patent
Matsumoto et al.

(10) Patent No.: US 12,770,283 B2
(45) Date of Patent: Oct. 20, 2026

(54) PLANE DETECTING DEVICE, AND PLANE DETECTING METHOD

(71) Applicant: Panasonic Intellectual Property Management Co., Ltd., Osaka (JP)

(72) Inventors: Riku Matsumoto, Hyogo (JP); Masamitsu Murase, Kyoto (JP); Ken Hatsuda, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 333 days.

(21) Appl. No.: 18/372,066

(22) Filed: Sep. 23, 2023

(65) Prior Publication Data

US 2024/0013421 A1 Jan. 11, 2024

Related U.S. Application Data

(63) Continuation of application No. PCT/JP2022/010326, filed on Mar. 9, 2022.

(30) Foreign Application Priority Data

Mar. 31, 2021 (JP) ................................ 2021-061257

(51) Int. Cl.
*G06K 9/00* (2022.01)
*G06T 7/50* (2017.01)
(Continued)

(52) U.S. Cl.
CPC .................. *G06T 7/60* (2013.01); *G06T 7/50* (2017.01); *G06T 7/70* (2017.01);
(Continued)

(58) Field of Classification Search
CPC .... G06T 7/60; G06T 7/50; G06T 7/70; G06T 2207/10028; G06T 2207/20076;
(Continued)

(56) References Cited

U.S. PATENT DOCUMENTS

2012/0075342 A1 3/2012 Choubassi et al.
2019/0004178 A1* 1/2019 Motoyama ............. G01S 17/87
(Continued)

FOREIGN PATENT DOCUMENTS

CN 102959946 A 3/2013
CN 108053491 A * 5/2018 ............. G06T 7/246
(Continued)

OTHER PUBLICATIONS

Detection, localisation and tracking of pallets using machine learning techniques and 2D range data, Ihab S. Mohamed et al., Springer, 2018, pp. 8811-8828 (Year: 2018).*
(Continued)

*Primary Examiner* — Jayesh A Patel
(74) *Attorney, Agent, or Firm* — RENNER, OTTO, BOISSELLE & SKLAR, LLP

(57) ABSTRACT

A plane detecting device according to the present disclosure includes an information acquisition unit, a likelihood acquisition unit, and a plane detector. The information acquisition unit acquires visible image information of a target having a predetermined plane and 3D coordinate information corresponding to the visible image information. The likelihood acquisition unit acquires likelihoods indicating a planarity of the predetermined plane of the target from the visible image information. The plane detector detects the predetermined plane of the target through a robust estimation method by using the 3D coordinate information and the likelihood.

8 Claims, 16 Drawing Sheets

(51) Int. Cl.
*G06T 7/60* (2017.01)
*G06T 7/70* (2017.01)

(52) U.S. Cl.
CPC ............... *G06T 2207/10028* (2013.01); *G06T 2207/20076* (2013.01); *G06T 2207/20081* (2013.01)

(58) Field of Classification Search
CPC ........... G06T 2207/20081; G06T 2207/10024; G06T 7/11; G06T 7/143
See application file for complete search history.

(56) References Cited

U.S. PATENT DOCUMENTS

| | | | | |
|---|---|---|---|---|
| 2019/0050681 | A1 | 2/2019 | Tate | |
| 2019/0206059 | A1* | 7/2019 | Landman | G06T 7/66 |
| 2021/0078843 | A1 | 3/2021 | Hattori | |
| 2021/0183095 | A1* | 6/2021 | Braunstain | G06T 7/00 |

FOREIGN PATENT DOCUMENTS

| | | | |
|---|---|---|---|
| JP | 2006-511066 | A | 3/2006 |
| JP | 2006-178696 | A | 7/2006 |
| JP | 2006-331074 | A | 12/2006 |
| JP | 2011-530706 | A | 12/2011 |
| JP | 2014-085940 | A | 5/2014 |
| JP | 2014-153336 | A | 8/2014 |
| JP | 2018-173275 | A | 11/2018 |
| JP | 2019-032773 | A | 2/2019 |
| JP | 2021-042070 | A | 3/2021 |
| WO | 2004/055870 | A1 | 7/2004 |
| WO | 2010/018009 | A1 | 2/2010 |
| WO | WO2010018009 | A * | 8/2010 |
| WO | WO2015017941 | A * | 12/2015 |

OTHER PUBLICATIONS

Cargo pallets real-time 3D positioning method based on computer vision, Tianjian Li et al., IET, 2018, pp. 8551-8555 (Year: 2018).*

Detection and localization of pallets on shelves using a wide-angle camera, Yasuyo Kita et al., IEEE, 2019, pp. 785-792 (Year: 2019).*

Automated detection of euro pallet loads by interpreting PMD camera depth images, F. Weichert et al., Springer, 2013, pp. 99-118 (Year: 2013).*

An Aircraft Pallet Damage Monitoring Method Based on Damage Subarea Identification and Probability-Based Diagnostic Imaging, Bin Liu et al., Wiley, 2019, pp. 1-12 (Year: 2019).*

Detection and Tracking of Pallets using a Laser Rangefinder and Machine Learning Techniques, Ihab Sami Mohamed Mohamed et al., HAL, 2017, pp. 1-49 (Year: 2017).*

Rahman Miftahur et al., "DL-RANSAC: An Improved RANSAC with Modified Sampling Strategy Based on the Likelihood", 2019 IEEE 4th International Conference on Image, Vision and Computing (ICIVC) [online], Feb. 6, 2020, pp. 463-468, < https://doi.org/10.1109/ICIVC47709.2019.8981025 >.

International Search Report for related Application No. PCT/JP2022/010326, mailed May 31, 2022.

The Chinese Search Report dated Mar. 6, 2026 for the related Chinese Patent Application No. 202280024975.0.

* cited by examiner

PLANE DETECTING DEVICE, AND PLANE DETECTING METHOD

BACKGROUND

1. Technical Field

The present disclosure relates to a plane detecting device and a plane detecting method.

2. Description of the Related Art

Patent Literature (PTL) 1 exists, for example, as a technique for detecting a plane. In the technique according to PTL 1, a surface is detected from an image to be captured by a time of flight (TOF) camera. PTL 1 describes detecting plane information from image data to be obtained by the TOF through an RANSAC (Random Sample Consensus) method.

PTL 1 is WO 2010/018009 A.

SUMMARY

However, for example, a technique capable of detecting a plane of a target with a higher accuracy than an accuracy of the technique described in PTL 1 has been required.

Therefore, the present disclosure provides a plane detecting device and a plane detecting method capable of detecting the plane of the target with a higher accuracy.

A plane detecting device according to one aspect of the present disclosure includes:

- an information acquisition unit that acquires visible image information of a target having a predetermined plane and 3D coordinate information corresponding to the visible image information;
- a likelihood acquisition unit that acquires likelihoods indicating a planarity of the predetermined plane of the target from the visible image information; and
- a plane detector that detects the predetermined plane of the target through a robust estimation method by using the 3D coordinate information and the likelihoods.

A plane detecting method according to another aspect of the present disclosure includes:

- acquiring visible image information of a target having a predetermined plane and 3D coordinate information corresponding to the visible image information;
- acquiring likelihoods indicating a planarity of the predetermined plane of the target from the visible image information; and
- detecting the predetermined plane of the target through a robust estimation method by using the 3D coordinate information and the likelihoods.

These general and specific aspects may be implemented by a system, a method, a computer program, a computer-readable recording medium, and a combination thereof.

According to the present disclosure, it is possible to provide a plane detecting device and a plane detecting method capable of detecting a plane of a target with a higher accuracy.

DETAILED DESCRIPTION

The present disclosure relates to a plane detecting device that detects a predetermined plane of a target. Hereinafter, exemplary embodiments will be specifically described with reference to drawings.

First Exemplary Embodiment

Figure 1:
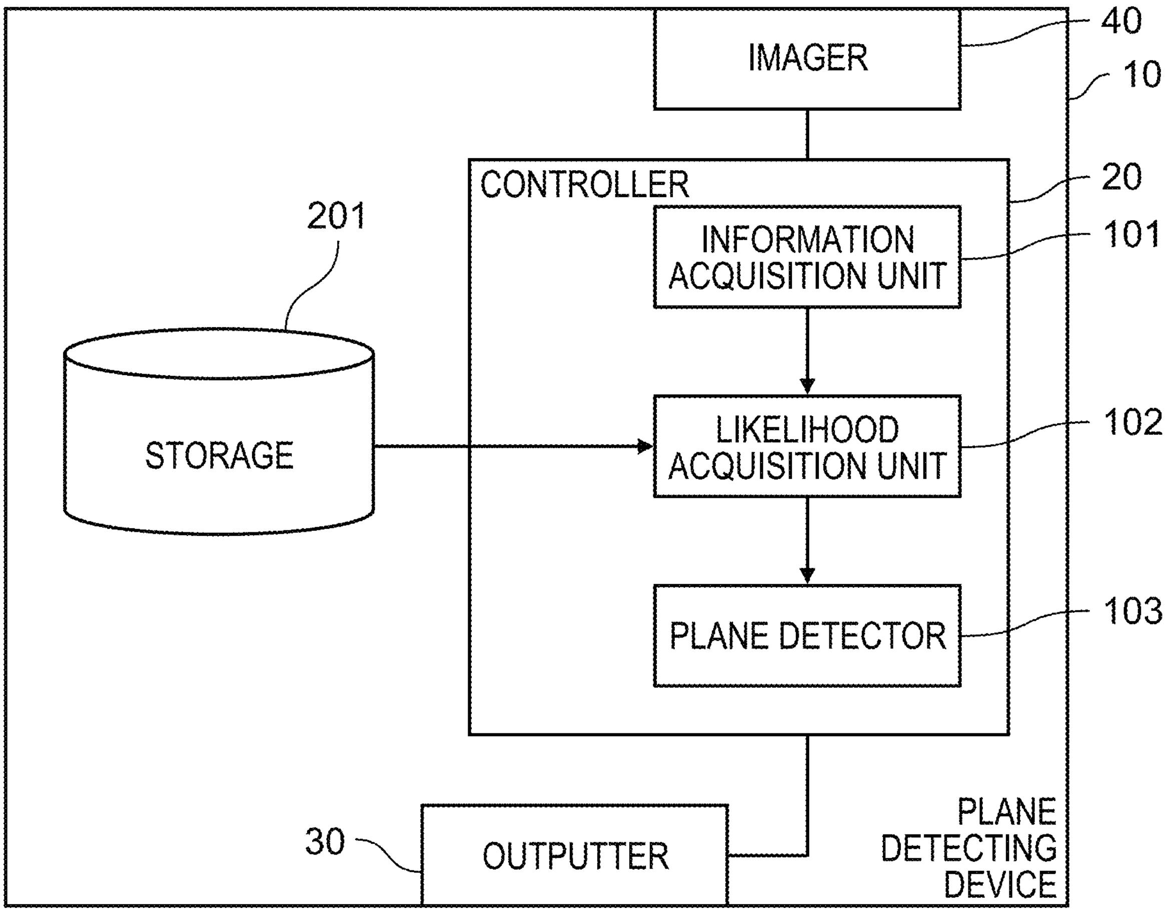
FIG. 1 is a diagram illustrating a schematic block configuration of a plane detecting device according to a first exemplary embodiment of the present disclosure.

FIG. 1 is a block diagram illustrating a schematic configuration of plane detecting device 10 according to the present exemplary embodiment. As illustrated in FIG. 1, plane detecting device 10 includes controller 20, outputter 30, and imager 40. Further, plane detecting device 10 further includes storage 201 that stores various data including a machine learning model. As illustrated in FIG. 1, controller 20 is communicably connected to outputter 30, imager 40, and storage 201.

(Configuration)

Controller 20 can include a microcomputer, a central processing unit (CPU), a micro processing unit (MPU), a graphics processing unit (GPU), a digital signal processor (DSP), a field programmable gate array (FPGA), or an application specific integrated circuit (ASIC). Functions of controller 20 may be implemented only by hardware, or may be implemented by a combination of the hardware and software.

Controller 20 implements predetermined functions by reading out data and programs stored in storage 201 to perform various arithmetic processing. Further, controller 20 includes information acquisition unit 101, likelihood acquisition unit 102, and plane detector 103 as functional blocks.

First, information acquisition unit 101 will be described. Information acquisition unit 101 acquires visible image information and 3D coordinate information of a target. Here, the target has a predetermined plane. Note that, plane detecting device 10 according to the present exemplary embodiment detects the predetermined plane by using each piece of information acquired by information acquisition unit 101. Information acquisition unit 101 acquires the each piece of information from image data of the target captured by imager 40. Imager 40 is, for example, a depth camera. In a case where imager 40 captures the target, information acquisition unit 101 acquires visible image information (RGB image data) of the target illustrated in FIG. 2 and the 3D coordinate information corresponding to the visible image information illustrated in FIG. 3.

Figure 2:
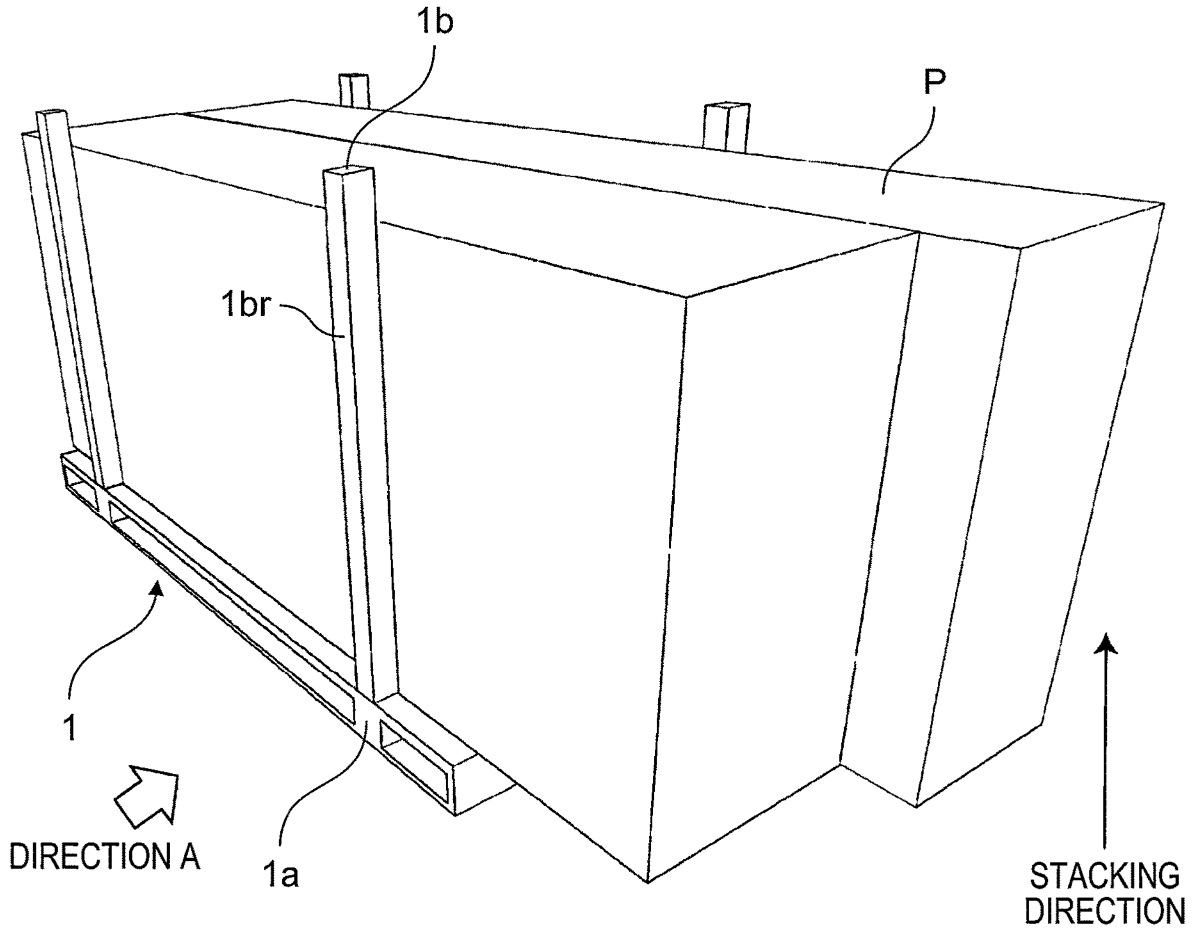
FIG. 2 is a schematic diagram illustrating an exemplary pallet included in visible image information.

As illustrated in FIG. 2, in the present exemplary embodiment, the target is pallet 1 capable of stacking object P. Further, pallet 1 includes flat plate 1*a* and first strut 1*b*. Object P is stacked on flat plate 1*a* in an up-down direction (stacking direction) in the drawing. First strut 1*b* extends from flat plate 1*a* in the stacking direction (up-down direction in FIG. 2). As illustrated in FIG. 2, first strut 1*b* has first surface 1*br* on an opposite side of a space where object P is stacked. In other words, first surface 1*br* faces an outer side of pallet 1. As illustrated in FIG. 2, first surface 1*br* faces direction A. The predetermined plane above includes first surface 1*br*. Note that, first strut 1*b* may be a rectangular parallelepiped, but is not limited thereto. First strut 1*b* may not be the rectangular parallelepiped as long as there is a plane region.

Figure 3:
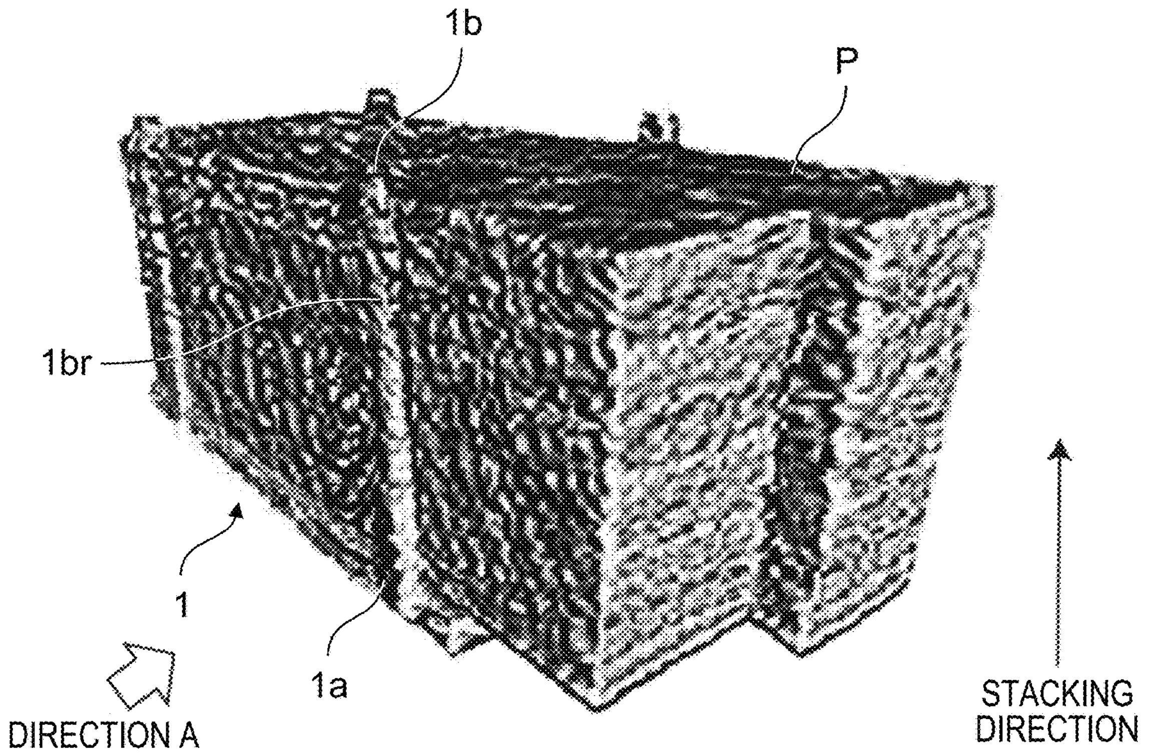
FIG. 3 is a diagram illustrating 3D coordinate information of the exemplary pallet.

The 3D coordinate information illustrated in FIG. 3 exemplifies an image picture. The 3D coordinate information includes 3D (three-dimensional) coordinate values corresponding to each pixel from the visible image information (color image). In other words, information including 3D coordinate values of the each pixel from the visible image information is the 3D coordinate information. Note that, a position of imager 40 (depth camera) is set as an origin. As a method for acquiring 3D coordinates, various methods such as Stereo and LiDAR can be adopted. Further, the 3D coordinates may be acquired by being transformed from, for example, a depth value.

Next, likelihood acquisition unit 102 will be described. Likelihood acquisition unit 102 acquires likelihoods indicating a planarity of the predetermined plane of the target from the visible image information illustrated in FIG. 2. Here, the "planarity of the predetermined plane" is a planarity of a specific plane region of a specific object. Likelihood acquisition unit 102 acquires (calculates) the likelihoods for the each pixel from the visible image information by using the visible image information as input information and the machine learning model. Here, the visible image information is acquired by information acquisition unit 101, and the machine learning model is stored in storage 201. Likelihood acquisition unit 102 calculates the likelihoods of the predetermined plane through inference such as Mask RCNN by using the visible image information and the machine learning model. In the present exemplary embodiment, likelihood acquisition unit 102 calculates likelihoods of first surface 1*br* of first strut 1*b* (from the above, the likelihoods here represent a planarity of a plane region on first surface 1*br* of first strut 1*b*) from the visible image information.

Figure 4:
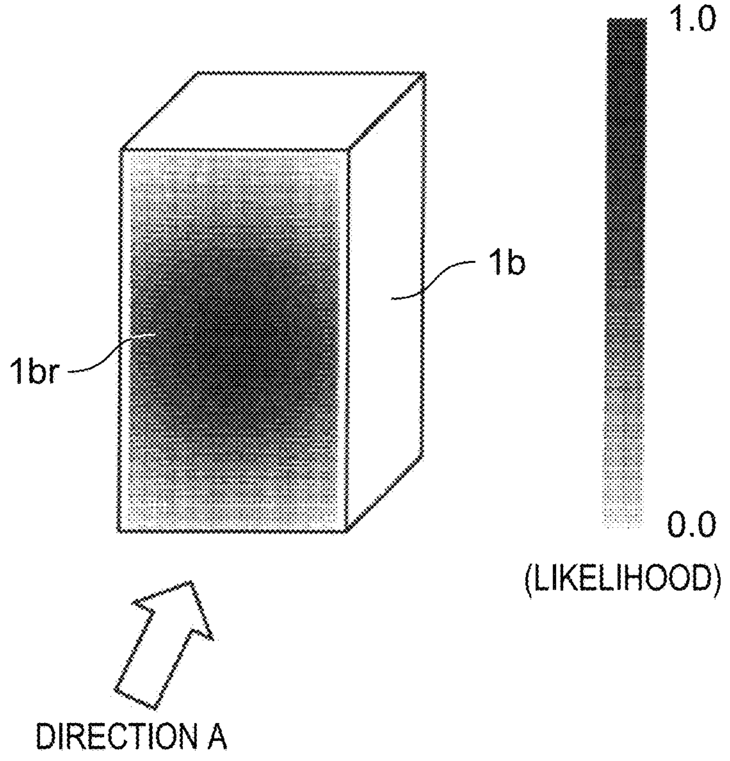
FIG. 4 is a diagram illustrating likelihoods of each pixel.

FIG. 4 is a schema exemplarily illustrating the likelihoods calculated for first surface 1*br* of first strut 1*b*. The likelihoods are calculated for the each pixel from the visible image information. Further, the likelihoods are calculated to be values of from 0 to 1 inclusive. In FIG. 4, the likelihoods for the each pixel of first surface 1*br* are visibly illustrated. Here, in FIG. 4, as a saturation of black and white increases, the likelihoods increase, and as the saturation of the black and the white decreases, the likelihoods decrease. For example, in a case where likelihoods of a certain pixel are 0, it is indicated that the planarity of the predetermined plane (first surface 1*br*) of the pixel is the lowest (white). In contrast, in a case where the likelihoods of the certain pixel are 1, it is indicated that the planarity of the predetermined plane (first surface 1*br*) of the pixel is the highest (black).

Note that, in the present exemplary embodiment, the acquisition (calculation) of the likelihoods is automatically performed by using the machine learning model. However, the likelihoods may be determined for the each pixel from the visible image information through another method. For example, likelihood acquisition unit 102 is connected to a portion (operation unit) that receives operations of a user, and may acquire the likelihoods based on input information from the operation unit. For example, the visible image information is displayed on, for example, a display (outputter 30), and the user manually performs an operation of selecting and determining the likelihoods of the each pixel through the operation unit. Likelihood acquisition unit 102 may determine (acquire) the likelihoods for the each pixel based on the operation. Note that, in this case, storage 201 that stores the machine learning model can be omitted.

Next, plane detector 103 will be described. The plane detector 103 detects a predetermined plane of the target through the robust estimation method by using the 3D coordinate information illustrated in FIG. 3 and the likelihoods acquired by likelihood acquisition unit 102. For example, plane detector 103 detects the predetermined plane of the target through, for example, RANSAC by using a plurality of sample points and the likelihoods each corresponding to respective one of the plurality of sample points. Here, the plurality of sample points (for example, at least three points or more) are randomly selected from the 3D coordinate information corresponding to the predetermined plane (for example, first surface 1*br*). Note that, in the present exemplary embodiment, the detection of the plane refers to estimation of a plane equation for the predetermined plane of the target. As a method for estimating the plane equation, for example, a least squares method can be adopted in addition to the RANSAC above.

In the present exemplary embodiment, plane detector 103 detects a plane in consideration of the likelihoods acquired by likelihood acquisition unit 102 (using the likelihoods) (that is, the likelihoods are used as "weights" during the robust estimation). Note that, specifically, a method for detecting the plane will be performed as described in actions to be described later.

Next, storage 201 will be described. Storage 201 is a storage medium that stores programs and data necessary to implement functions of plane detecting device 10. For example, storage 201 can be implemented by, for example, the hard disk (HDD), the solid state drive (SSD), the random access memory (RAM), the dynamic RAM (DRAM), the ferroelectric memory, the flash memory, the magnetic disk, or a combination thereof.

Further, the machine learning model constructed by machine learning is stored in storage 201. The machine learning model is used by likelihood acquisition unit 102 during the acquisition (calculation) of the likelihoods. In the present exemplary embodiment, the machine learning is performed in advance to generate the machine learning model. In this way, the likelihoods of first surface 1*br* of first strut 1*b* included in pallet 1 can be calculated. In other words, the machine learning is performed to calculate the likelihoods of only the specific plane region (first surface 1*br*) other than entire pallet 1.

The likelihoods indicate the planarity the predetermined plane of the target. In the present exemplary embodiment, the likelihoods indicate the planarity of first surface 1*br* of first strut 1*b* of pallet 1.

The machine learning model can be generated, for example, as follows. First, the visible image information (image data) of pallet 1 is acquired. Then, the planarity of first surface 1*br* (predetermined plane) is labeled for the each pixel from the visible image information. The machine learning model can be generated through the machine learning by performing the process on a plurality of pieces of visible image information, and using results of the labeling.

Outputter 30 has a display that displays arithmetic processing results of controller 20. For example, the display may include a liquid crystal display or an organic EL display. Further, outputter 30 may include, for example, a speaker that emits sounds.

Imager 40 captures the target as an object. Based on imaging information from imager 40, information acquisition unit 101 acquires visible image data of the target and 3D coordinate information associated with the visible image data. The visible image data are data of the color image. The 3D coordinate information associated with the visible image data refers to information of the 3D coordinates corresponding to the each pixel of the image data.

Imager 40 is, for example, the depth camera. The depth camera measures a distance to a target to generate depth information indicating the distance measured as a depth value for each pixel. For example, the depth camera may be an infrared active stereo camera, or a LiDAR depth camera. Note that, imager 40 is not limited to these depth cameras.

(Actions)

Figure 5:
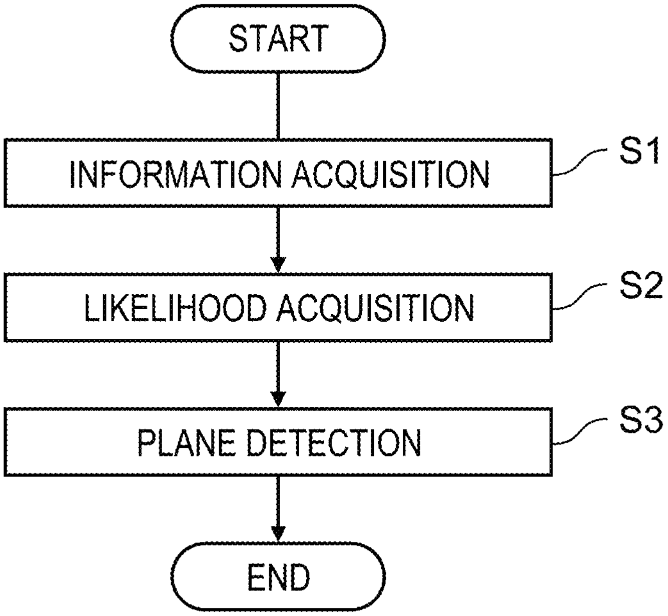
FIG. 5 is a flowchart illustrating a flow of a plane detecting method.

FIG. 5 is a diagram illustrating a flow of the plane detecting method according to the present exemplary embodiment. Hereinafter, specific plane detecting actions will be described by using the schematic configuration diagram illustrated in FIG. 1 and the flow illustrated in FIG. 5. Note that, in the present exemplary embodiment, a case of detecting the predetermined plane including first surface 1*br* of pallet 1 as the target will be described in detail.

Note that, before step S3 in FIG. 5 to be described later is started on the target to be subjected to the plane detection, 0 (zero) is set in plane detecting device 10 as provisional addition value L' being default, and nothing (for example, a value such as 0 or null is set) is set as provisional plane equation θ' (hereinafter, referred to as provisional plane θ') being default.

Imager 40 captures pallet 1. Information acquisition unit 101 receives results of the imaging to acquire the visible image information (with reference to FIG. 2) of pallet 1 and the 3D coordinate information (with reference to FIG. 3) corresponding to the visible image information (step S1 in FIG. 5).

Next, likelihood acquisition unit 102 acquires (calculates) the likelihoods for first strut 1*b* of pallet 1 from the visible image information (step S2 in FIG. 5). Here, the likelihoods are acquired by using the machine learning model. Further, the likelihoods are calculated for the each pixel indicating first surface 1*br* of first strut 1*b*. FIG. 4 illustrates the likelihoods of the each pixel on first surface 1*br* in a visible manner. As described above, first surface 1*br* faces the opposite side of the space where object P of pallet 1 is stacked (first surface facing direction A as illustrated in FIG. 4).

Next, plane detector 103 detects the predetermined plane including first surface 1*br* of pallet 1 through the robust estimation method by using the 3D coordinate information acquired by information acquisition unit 101 and the likelihoods acquired by likelihood acquisition unit 102 (step S3 in FIG. 5).

Figure 6:
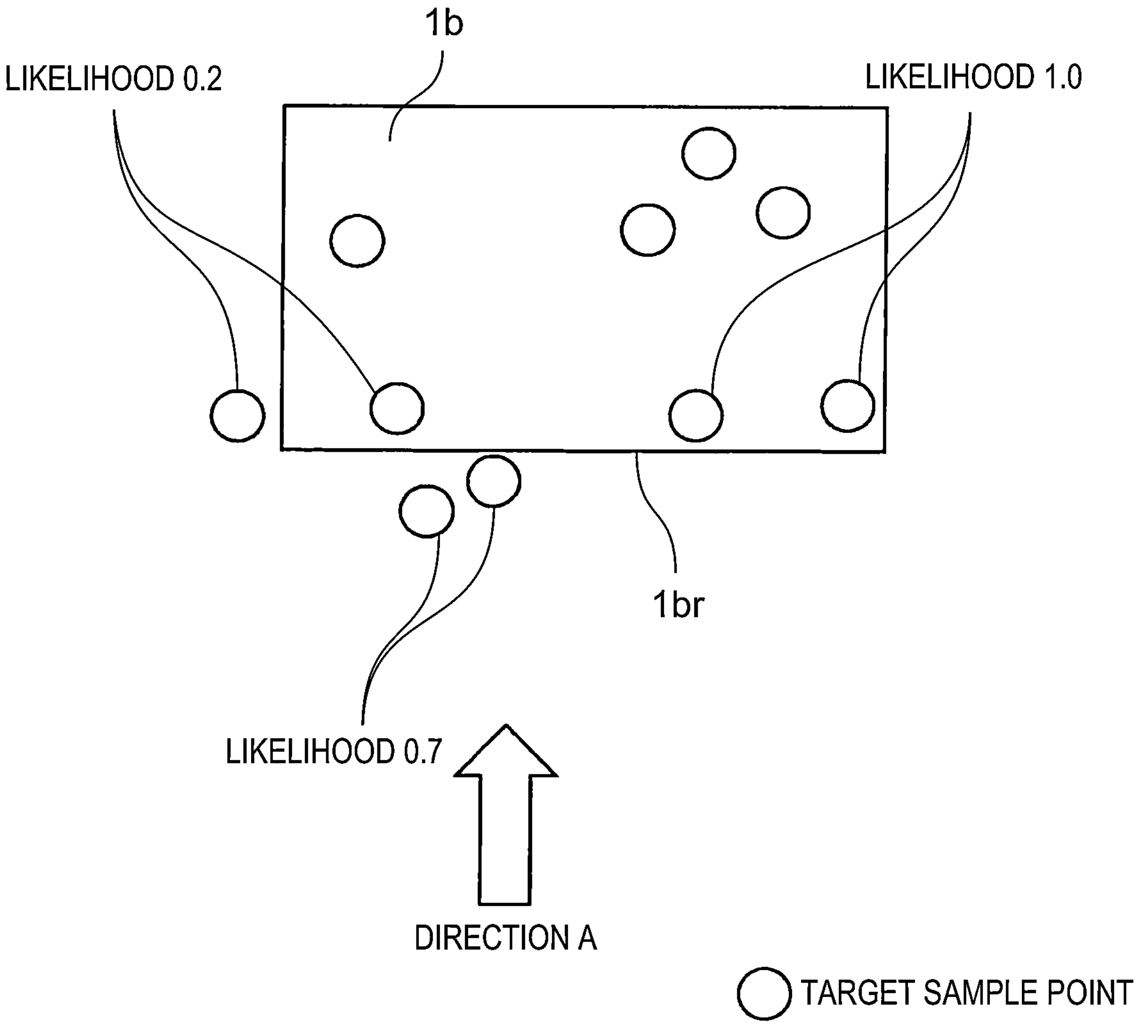
FIG. 6 is a schematic diagram illustrating an action of the plane detecting method.

Specifically, first, plane detector 103 obtains target sample points belonging to first surface 1*br* in the 3D coordinate information acquired by information acquisition unit 101. For example, sample points belonging to a region where the likelihoods>0 can be obtained as the target sample points. FIG. 6 illustrates a state where the target sample points belonging to first surface 1*br* is obtained. FIG. 6 is a diagram of first strut 1*b* in FIG. 4 as viewed from above. Each white circles indicates each of the target sample points obtained. Further, as illustrated in FIG. 6, the likelihoods acquired in step S2 are each associated with a respective one of the target sample points.

Figure 7:
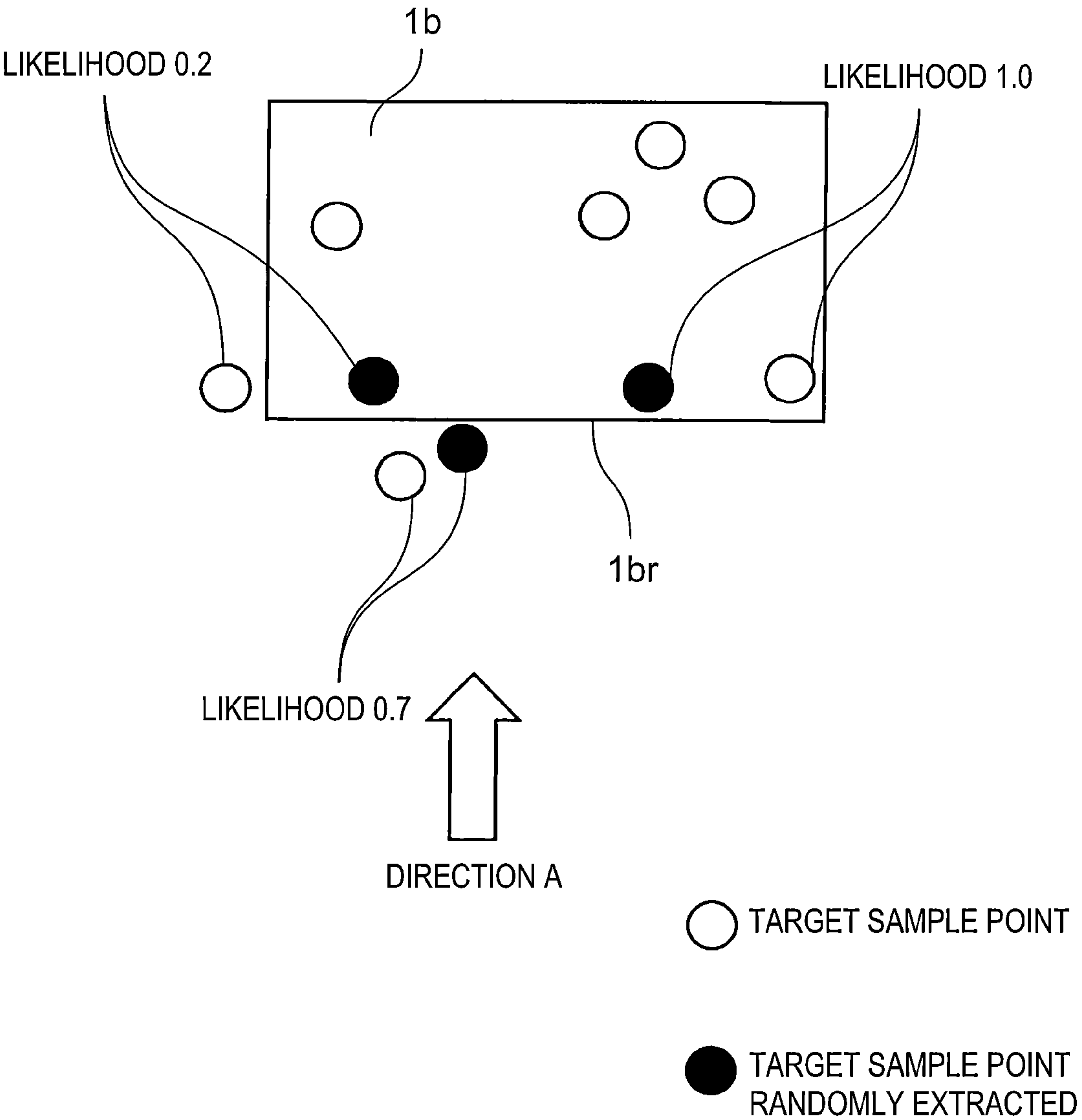
FIG. 7 is a schematic diagram illustrating an action of the plane detecting method.

Next, plane detector 103 randomly extracts at least three target sample points from the plurality of target sample points above in the 3D coordinate information (with reference to FIG. 7). For example, the extraction is performed through the RANSAC. In an example of FIG. 7, black circles are the target sample points randomly extracted. In the example of FIG. 7, the number of the target sample points randomly extracted is three. Note that, a process of extracting the target sample point is referred to as a random extraction process.

Figure 8:
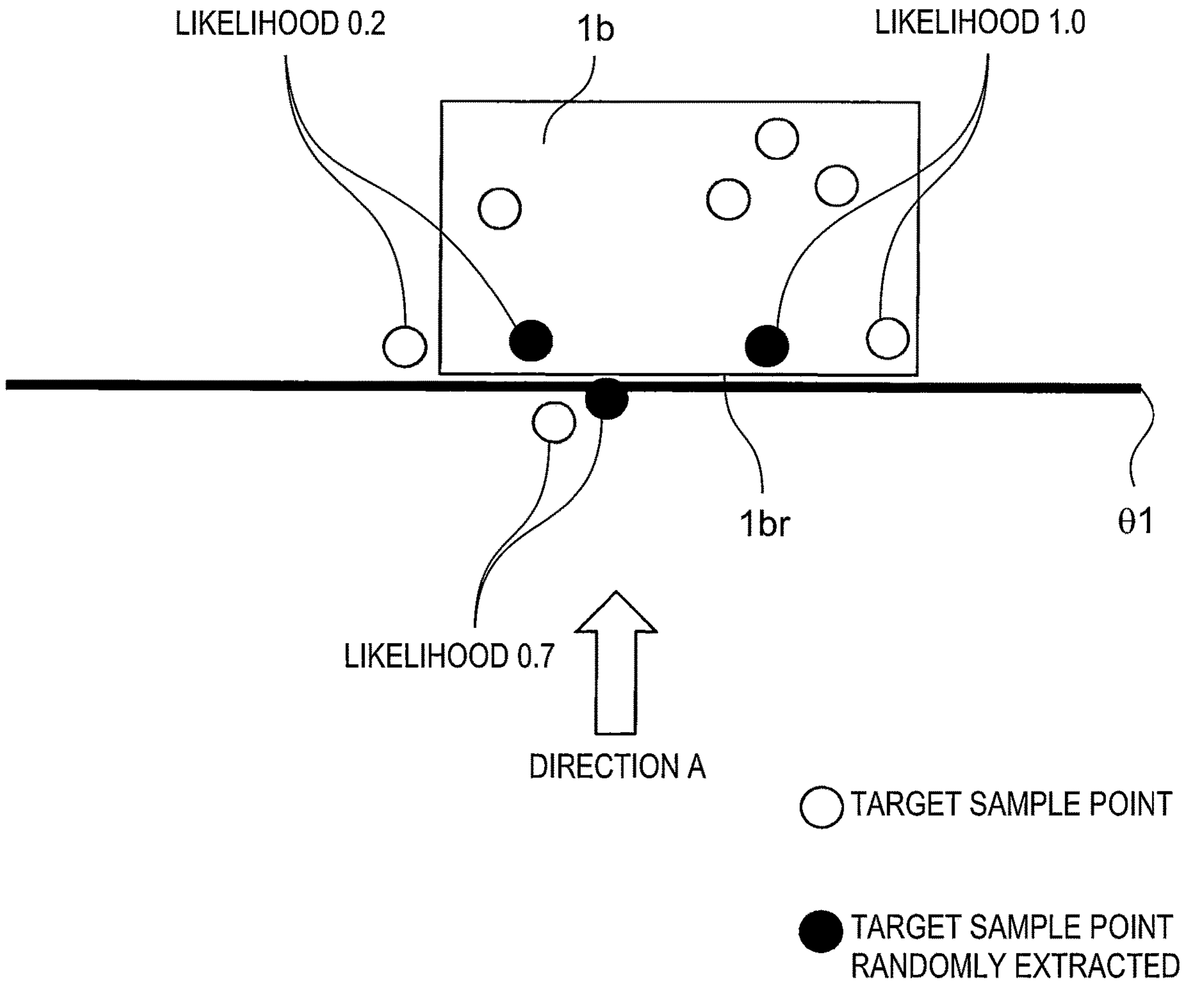
FIG. 8 is a schematic diagram illustrating an action of the plane detecting method.

Next, plane detector 103 obtains plane equation θ (hereinafter, simply referred to as plane θ) based on the three target sample points extracted above through, for example, the RANSAC. For example, here, plane θ1 is obtained as plane θ. FIG. 8 illustrates plane θ1 obtained. Note that, a process of obtaining plane θ is referred to as a plane equation acquisition process.

Figure 9:
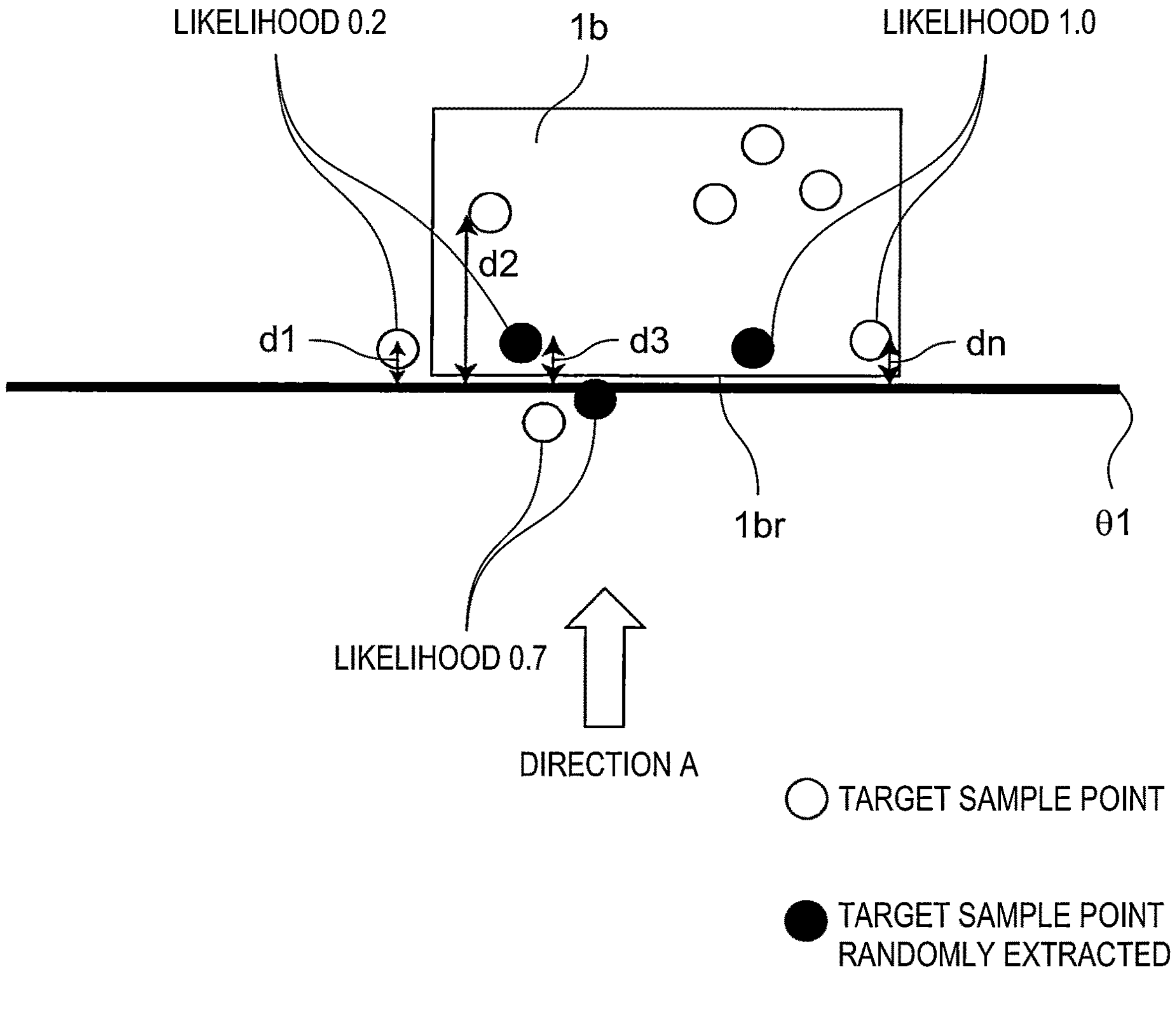
FIG. 9 is a schematic diagram illustrating an action of the plane detecting method.

Next, plane detector 103 obtains a distance from plane θ1 to the each of the target sample points belonging to first surface 1*br*, respectively. FIG. 9 illustrates distances d1, d2, d3, dn obtained, respectively. Note that, although only distances d1, d2, d3, dn are illustrated in FIG. 9 for simplification, plane detector 103 performs a process of obtaining the distances above for all the target sample points belonging to first surface 1*br*. Note that, the process of obtaining each distance is referred to as a distance acquisition process.

Figure 10:
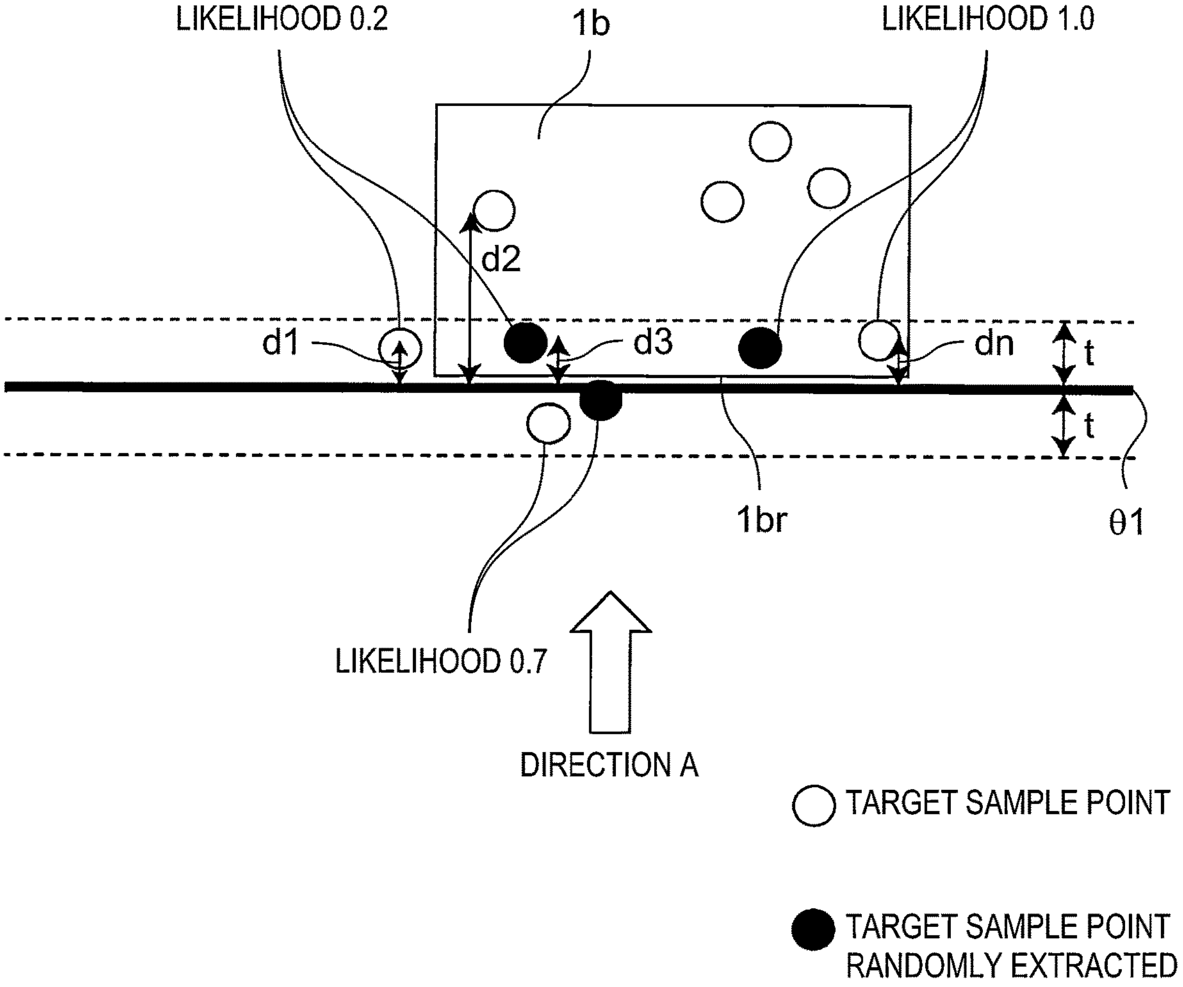
FIG. 10 is a schematic diagram illustrating an action of the plane detecting method.

Next, plane detector 103 extracts, from all the target sample points (for example, all the target sample points having likelihoods of greater than 0), the target sample points having distances d1, d2, d3, dn obtained above of less than threshold values t (with reference to FIG. 10). As illustrated in FIG. 10, the distances to threshold values t are indicated by dotted lines. Threshold values t are preset values, and as can be seen from FIG. 10 illustrated, the dotted lines are drawn at positions where the distances from plane θ1 being current plane θ are threshold values t. Accordingly, in the process here, plane detector 103 extracts the target sample points existing in, for example, a region surrounded by the dotted lines in FIG. 10. Note that, in the present exemplary embodiment, since "less than threshold values t", the target sample points existing on the dotted lines are not extracted.

Here, the likelihoods are determined for all the target sample points through the likelihood acquisition process described above. Therefore, plane detector 103 obtains likelihood addition value L of all the target sample points having the distances from plane θ1 of less than threshold values t. For example, in a case of an example of FIG. 10, a total of six target sample points exist in the region surrounded by the dotted lines. Accordingly, plane detector 103 extracts the six target sample points. Here, in FIG. 10, likelihood values are assigned to the six target sample points. Therefore, in the case of the example of FIG. plane detector 103 obtains likelihood addition value L for the six target sample points. In the example of FIG. 10, 0.2, 0.2, 0.7, 0.7, 1.0, and 1.0 are assigned as the likelihoods to a respective one of the target sample points. Therefore, plane detector 103 obtains 3.8 (=0.2+0.2+0.7+0.7+1.0+1.0) as likelihood addition value L. Note that, a process of extracting the target sample points having distances d1, d2, d3, do obtained above of less than threshold values t from all the target sample points and obtaining likelihood addition value L is referred to as an addition value L acquisition process.

Next, plane detector 103 compares provisional addition value L' being currently set with likelihood addition value L obtained this time. Then, a larger value is newly set as provisional addition value L'. Here, as described above, provisional addition value L' being currently set as default is 0. Accordingly, likelihood addition value L obtained this time is always larger than default provisional addition value L'. Accordingly, plane detector 103 sets likelihood addition value L obtained this time as a new provisional addition value L'. In a case of an example above, 3.8 is set as the new provisional addition value L' in plane detecting device 10.

Moreover, plane detector 103 newly sets plane θ corresponding to provisional addition value L' newly set as provisional plane θ' in plane detecting device 10. In this case, addition value L (=3.8) is obtained for plane θ1, and addition value L (=3.8) is set as the new provisional addition value L'. Therefore, plane detector 103 newly sets plane θ1 corresponding to likelihood addition value L (=3.8) obtained above as provisional plane θ' in plane detecting device 10.

A process of a magnitude relationship between provisional addition value L' above and likelihood addition value L and a new setting process of provisional addition value L' and provisional plane θ' will be referred to as a provisional value setting process.

A series of the random extraction process, the plane equation acquisition process, the distance acquisition process, the addition value L acquisition process, and the provisional value setting process above is referred to as a plane setting loop. In step S3 of FIG. 5, the plane setting loop is performed a predetermined number of times. The predetermined number of times may be set in advance in, for example, plane detecting device 10. In this case, high accuracy can be achieved. In contrast, the predetermined number of times can be obtained in an algorithm (with reference to, for example, http://people.inf.ethz.ch/pomarc/pubs/RaguramPAMI13.pdf). In this case, a higher speed process becomes possible. Note that, as an example, here, k times is set in plane detecting device 10 as the predetermined number of times of the plane setting loop.

Figure 11:
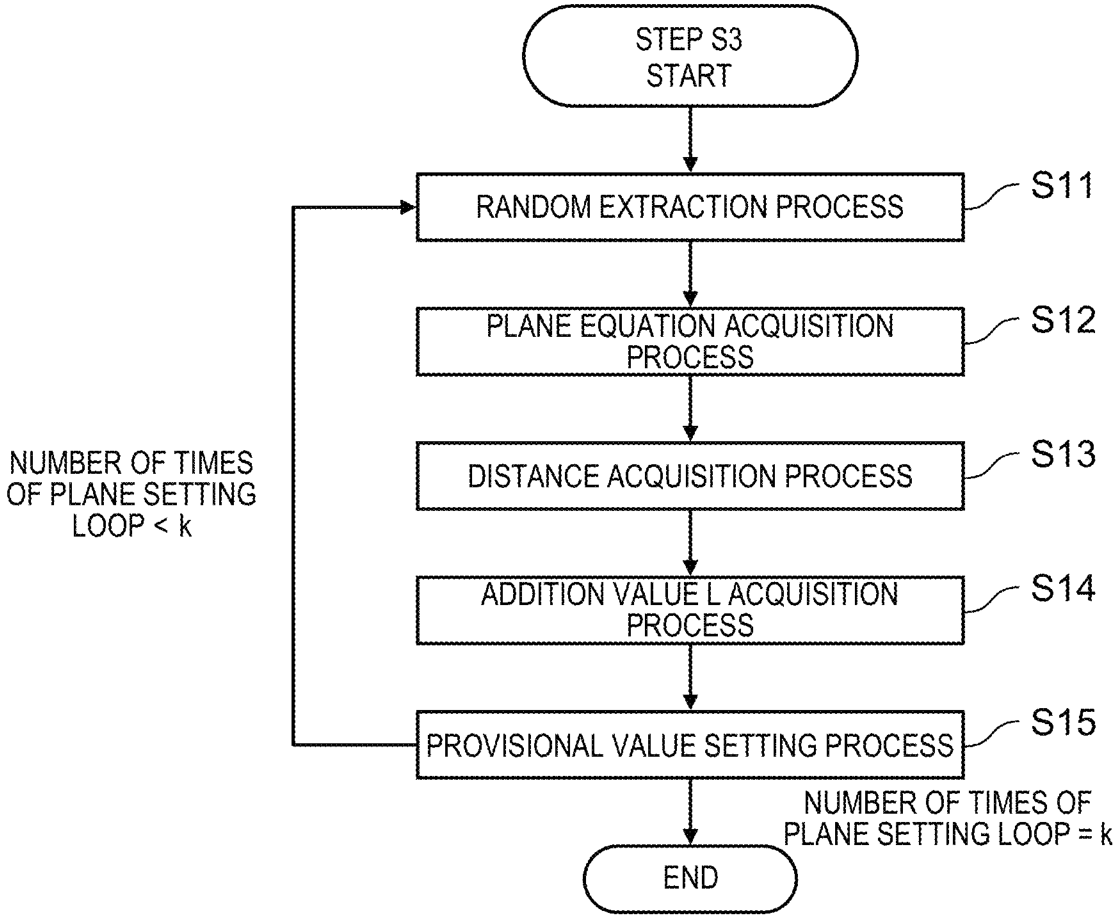
FIG. 11 is a flowchart illustrating a specific flow of plane detection.

FIG. 11 is a diagram illustrating a flow of the plane setting loop in step S3 of FIG. As illustrated in FIG. 11, the plane setting loop includes random extraction process S11, plane equation acquisition process S12, distance acquisition process S13, addition value L acquisition process S14, and provisional value setting process S15. Further, FIG. 11 illustrates that, in a case where the plane setting loop ends less than k times (that is, k−1 times), the process returns from provisional value setting process S15 to random extraction process S11, and next, the plane setting loop is performed. Moreover, FIG. 11 illustrates that, in a case where the plane setting loop ends k times, the plane setting loop (in other words, the plane detection process in step S3 of FIG. 5) ends.

Note that, in an example above, at a point of time when a first plane setting loop ends, 3.8 is set as provisional addition value L', and θ1 is set as provisional plane θ'. Note that, in a case where the predetermined number of times is 2 or more, the process returns to random extraction process S11 in FIG. 11, and a second plane setting loop is performed.

For example, plane detector 103 separately and randomly extracts three target sample points from the plurality of target sample points above according to 3D coordinate information (with reference to random extraction process S11 in FIG. 11).

Next, plane detector 103 obtains plane θ2 as the plane equation based on the three target sample points extracted above by, for example, the RANSAC (with reference to plane equation acquisition process S12 in FIG. 11).

Next, plane detector 103 obtains a distance from plane θ2 to the each of the target sample points belonging to first surface 1*br*, respectively (with reference to distance acquisition process S13 in FIG. 11).

Next, plane detector 103 extracts, from all the target sample points (for example, all the target sample points having the likelihoods of greater than 0), the target sample points having the distances obtained above of less than threshold values t. Then, plane detector 103 obtains likelihood addition value L of all the target sample points having the distances from plane θ2 of less than threshold values t (with reference to addition value L acquisition process S14 in FIG. 11). For example, in the second plane setting loop, 3.0 is acquired as likelihood addition value L.

Next, plane detector 103 compares provisional addition value L' (=3.8) being currently set with likelihood addition value L obtained this time (here, second time). Then, a larger value is newly set as provisional addition value L' (with reference to provisional value setting process S15 in FIG. 11). Here, as described above, provisional addition value L' being currently set is 3.8, and likelihood addition value L obtained in the second plane setting loop is 3.0. Accordingly, plane detector 103 sets a value being currently set as the new provisional addition value L'. In other words, the value of 3.8 is continuously set as provisional addition value L'.

Moreover, plane detector 103 newly sets plane θ corresponding to provisional addition value L' newly set as provisional plane θ' in plane detecting device 10 (with reference to provisional value setting process S15 in FIG. 11). In this case, addition value L (=3.8) is obtained for plane θ1, and addition value L (=3.8) is set as the new provisional addition value L'. Therefore, plane detector 103 newly sets plane θ1 corresponding to likelihood addition value L (=3.8) obtained above as provisional plane θ' in plane detecting device 10 (continuously sets plane θ1).

As described above, if the process of the second plane setting loop ended and the number of times of the plane setting loop ended so far is less than k times, the process returns to step S11 and next, the plane setting loop is started. Note that, as described above, in the case where the plane setting loop illustrated in FIG. 11 ends k times, the plane setting loop (in other words, the plane detection process in step S3 of FIG. 5) ends. Then, in a case where the process of step S3 ends, plane detector 103 outputs provisional addition value L' and provisional plane θ' set during the end as plane detection results. In other words, provisional plane θ' to be output represents an equation relating to the plane detected from the target.

(Description of Effects)

In a first aspect of the present exemplary embodiment, plane detecting device 10 includes information acquisition unit 101, likelihood acquisition unit 102, and plane detector 103. Information acquisition unit 101 acquires the visible image information of the target having the predetermined plane and the 3D coordinate information corresponding to the visible image information. Likelihood acquisition unit 102 acquires the likelihoods indicating the planarity of the predetermined plane of the target from the visible image information. Then, plane detector 103 detects the predetermined plane of the target through the robust estimation method by using the 3D coordinate information and the likelihoods.

In another aspect of the present exemplary embodiment, information acquisition unit 101 acquires the visible image information of the target having the predetermined plane and the 3D coordinate information corresponding to the visible image information. Then, the likelihoods indicating the planarity of the predetermined plane of the target are required from the visible image information. Then, the predetermined plane of the target is detected through the robust estimation method by using the 3D coordinate information and the likelihoods.

In other words, plane detecting device 10 detects the plane by using the likelihoods. Accordingly, the predetermined plane of the target can be detected with the higher accuracy than an accuracy of a conventional plane detection. For example, even in a case where there is an object to be an occlusion such as paper in a specific target plane, and a plurality of sample points apart from the specific target plane in distance are included, it is possible to robustly detect the predetermined plane of the target with the high accuracy.

For example, with reference to FIG. 10, a method for detecting the predetermined plane based on a proportion of the target sample points included in a range where the distance from plane θ1 is less than threshold values t (in-range target sample points), that is, the proportion of the in-range target sample points to all the target sample points is also considered (for example, a plane having a largest proportion is detected as the predetermined plane of the target). In contrast, in the present exemplary embodiment, the detection process of the predetermined plane is performed by using likelihood information. Accordingly, for example, in a case where the number of times of a loop of the RANSAC algorithm is set, the high accuracy can be achieved, and on the other hand, in a case where the predetermined number of times of the loop is obtained in the algorithm, a high speed can be achieved.

Further, in a second aspect of the present exemplary embodiment, plane detecting device 10 further includes storage 201 that stores the machine learning model constructed by the machine learning. Then, likelihood acquisition unit 102 acquires the likelihoods for each pixel from the visible image information by using the visible image information as input information and the machine learning model. Accordingly, likelihood acquisition unit 102 can acquire the likelihoods for the each pixel from the visible image information more quickly and with the higher accuracy.

Further, in a third aspect of the present exemplary embodiment, the target includes pallet 1 capable of stacking object P. Accordingly, it is possible to detect surfaces of pallet 1 used in, for example, a factory. In this way, for example, it is possible to, for example, control each automatic action using detection results of the surfaces.

Further, in a fourth aspect of the present exemplary embodiment, pallet 1 above includes flat plate 1*a* and first strut 1*b*. Object P is stacked on flat plate 1*a*. First strut 1*b* extends from flat plate 1*a* in a direction where object P is stacked. Then, the predetermined plane includes first surface 1*br* of first strut 1*b*. Therefore, in a case where pallet 1 has first strut 1*b* extending in a perpendicular direction (stacking direction of object P), first surface 1*br* of first strut 1*b* can be detected.

Further, in a fifth aspect of the present exemplary embodiment, plane detector 103 detects the predetermined plane of the target through the RANSAC by using the plurality of sample points randomly selected from the 3D coordinate information and the likelihoods each corresponding to a respective one of the plurality of sample points. Accordingly, first surface 1*br* of the target can be automatically, accurately, and practically detected.

Second Exemplary Embodiment

In the first exemplary embodiment, as an example, the case of detecting the predetermined plane including first surface 1*br* of pallet 1 has been described. In the present exemplary embodiment, a predetermined plane detection process in a case where pallet 1 as the target has, for example, two struts (first strut and second strut) will be described. In other words, in the present exemplary embodiment, a case of detecting the predetermined plane including a first surface and a second surface will be described in detail in a case where the first strut has the first surface and the second strut has the second surface.

Figure 12:
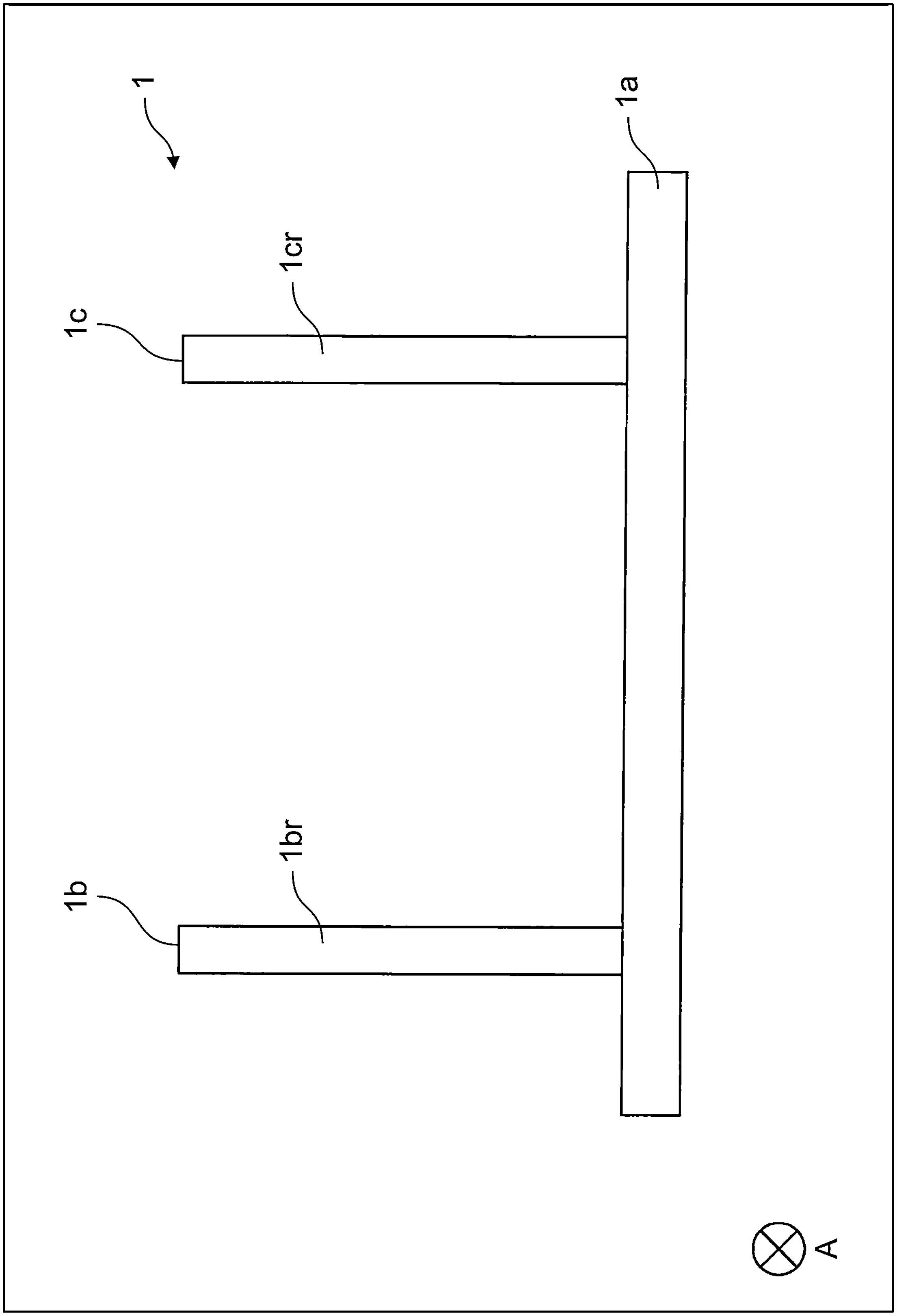
FIG. 12 is a schematic diagram illustrating the exemplary pallet.

As illustrated in FIG. 12, also in the present exemplary embodiment, the target is pallet 1 capable of stacking an object. FIG. 12 is a schematic diagram of pallet 1 in a case where pallet 1 is viewed from a side (from direction A such as in FIG. 4). In the present exemplary embodiment, pallet 1 includes flat plate 1*a*, first strut 1*b*, and second strut 1*c*. Note that, direction A is a direction from a front to a back of a paper surface in FIG. 12.

The object is stacked on flat plate 1*a* in the up-down direction in FIG. 12. First strut 1*b* extends from flat plate 1*a* in a direction of the stacking (up-down direction in FIG. 12). First strut 1*b* has first surface 1*br* on the opposite side of the space where object P is stacked. In other words, first surface 1*br* faces the outer side of pallet 1 (faces direction A). Further, second strut 1*c* extends from flat plate 1*a* in the direction of the stacking (up-down direction in FIG. 12). Further, second strut 1*c* is arranged with respect to flat plate 1*a* separately from first strut 1*b*. In other words, as illustrated in FIG. 12, second strut 1*c* is disposed at a position apart from first strut 1*b*. Second strut 1*c* has second surface 1*cr* on the opposite side of the space where object P is stacked. In other words, second surface 1*cr* faces the outer side of pallet 1 (faces direction A).

Here, in the present exemplary embodiment, first surface 1*br* and second surface 1*cr* exist in the same plane. In other words, in the present exemplary embodiment, the predetermined plane having first surface 1*br* and second surface 1*cr* is detected. Note that, as first strut 1*b* is described in the first exemplary embodiment, second strut 1*c* may be the rectangular parallelepiped, but is not limited thereto. Second strut 1*c* may not be the rectangular parallelepiped as long as there is a plane region.

Note that, also in the present exemplary embodiment, a physical configuration of plane detecting device 10 is similar to a physical configuration illustrated in the schematic block diagram of FIG. 1. Further, also in the present exemplary embodiment, plane detecting device 10 performs a series of processes in a flow similar to the flow in FIG. 5, and plane detector 103 performs a series of processes in a flow similar to the flow in FIG. 11. Hereinafter, the plane detecting actions will be described focusing on differences.

(Actions)

In the present exemplary embodiment, pallet 1 as the target has first surface 1*br* and second surface 1*cr*. Then, hereinafter, a case of detecting the predetermined plane including first surface 1*br* and second surface 1*cr* will be described in detail.

Note that, as in the first exemplary embodiment, before step S3 in FIG. 5 is started on the target to be subjected to the plane detection, 0 (zero) is set in plane detecting device 10 as provisional addition value L' being default, and nothing (for example, the value such as 0 or null is set) is set as provisional plane equation θ' (hereinafter, referred to as provisional plane θ') being default.

Imager 40 captures pallet 1. Information acquisition unit 101 acquires the visible image information (with reference to FIG. 2) of pallet 1 and the 3D coordinate information (with reference to FIG. 3) corresponding to the visible image information by the capturing (step S1 in FIG. 5).

Next, likelihood acquisition unit 102 acquires (calculates) the likelihoods for first strut 1*b* and second strut 1*c* from the visible image information (step S2 in FIG. 5). A method for acquiring the likelihoods is as in the first exemplary embodiment. The likelihoods are acquired for each pixel indicating first surface 1*br* of first strut 1*b* and each pixel indicating second surface 1*cr* of second strut 1*c*. Further, in the present exemplary embodiment, the likelihoods indicate the planarity of first surface 1*br* of first strut 1*b* and a planarity of second surface 1*cr* of second strut 1*c*.

Next, plane detector 103 detects the predetermined plane above through the robust estimation method (RANSAC) by using the 3D coordinate information acquired by information acquisition unit 101 and the likelihoods acquired by likelihood acquisition unit 102 (step S3 in FIG. 5).

Figure 13:
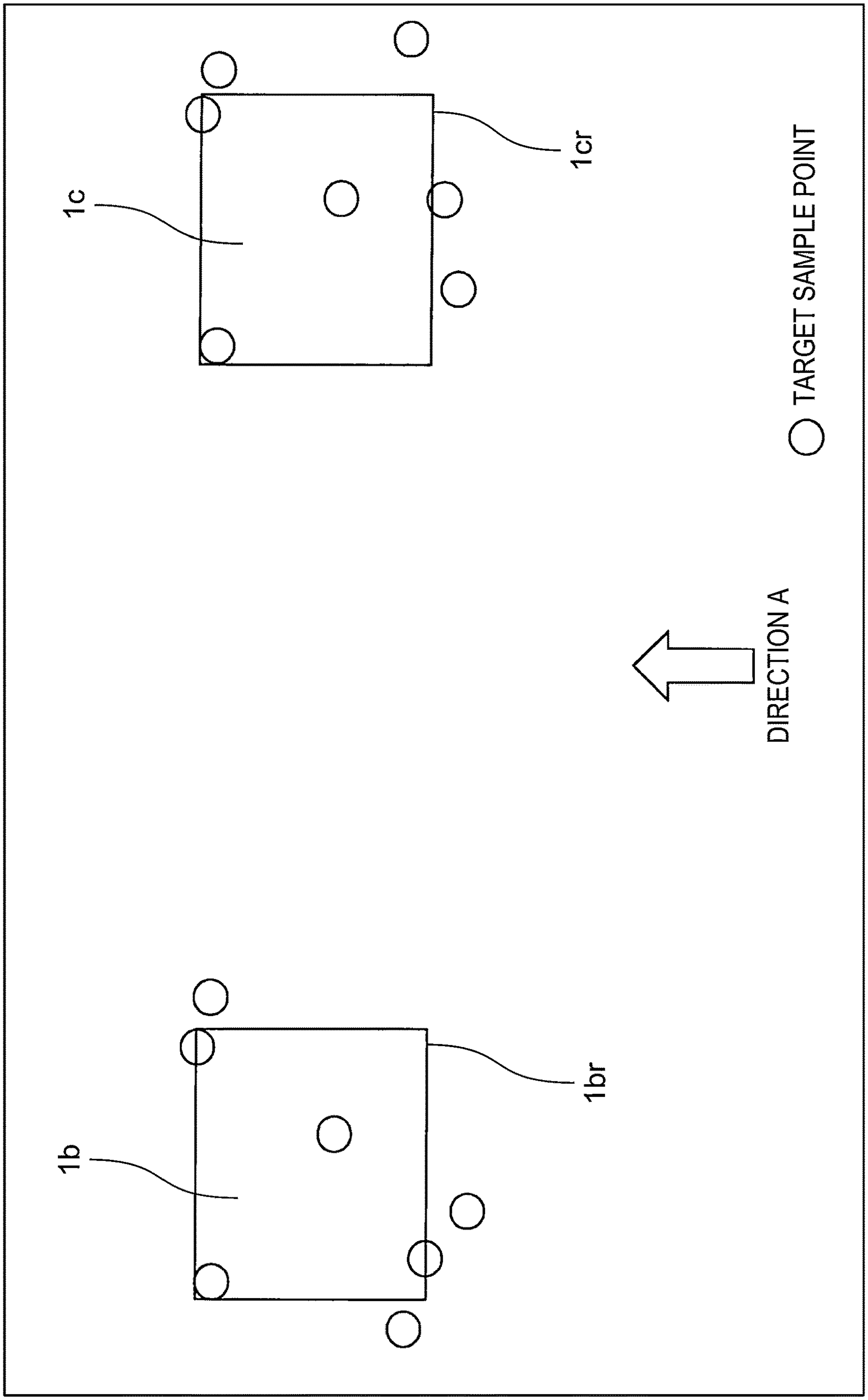
FIG. 13 is a schematic diagram illustrating an action of the plane detecting method.

Specifically, first, plane detector 103 obtains target sample points belonging to first surface 1*br* in the 3D coordinate information acquired by information acquisition unit 101. Moreover, plane detector 103 obtains target sample points belonging to second surface 1*cr* in the 3D coordinate information acquired by information acquisition unit 101. Note that, a method for acquiring the target sample point is as in the first exemplary embodiment. Further, FIG. 13 illustrates a state where the target sample points belonging to first surface 1*br* and the target sample points belonging to second surface 1*cr* are obtained. FIG. 13 is a diagram of first strut 1*b* and second strut 1*c* as viewed from above. Each white circles indicates each of the target sample points obtained. Further, each of the likelihoods acquired in step S2 (FIG. 5) are associated with a respective one of the target sample points.

Figure 14:
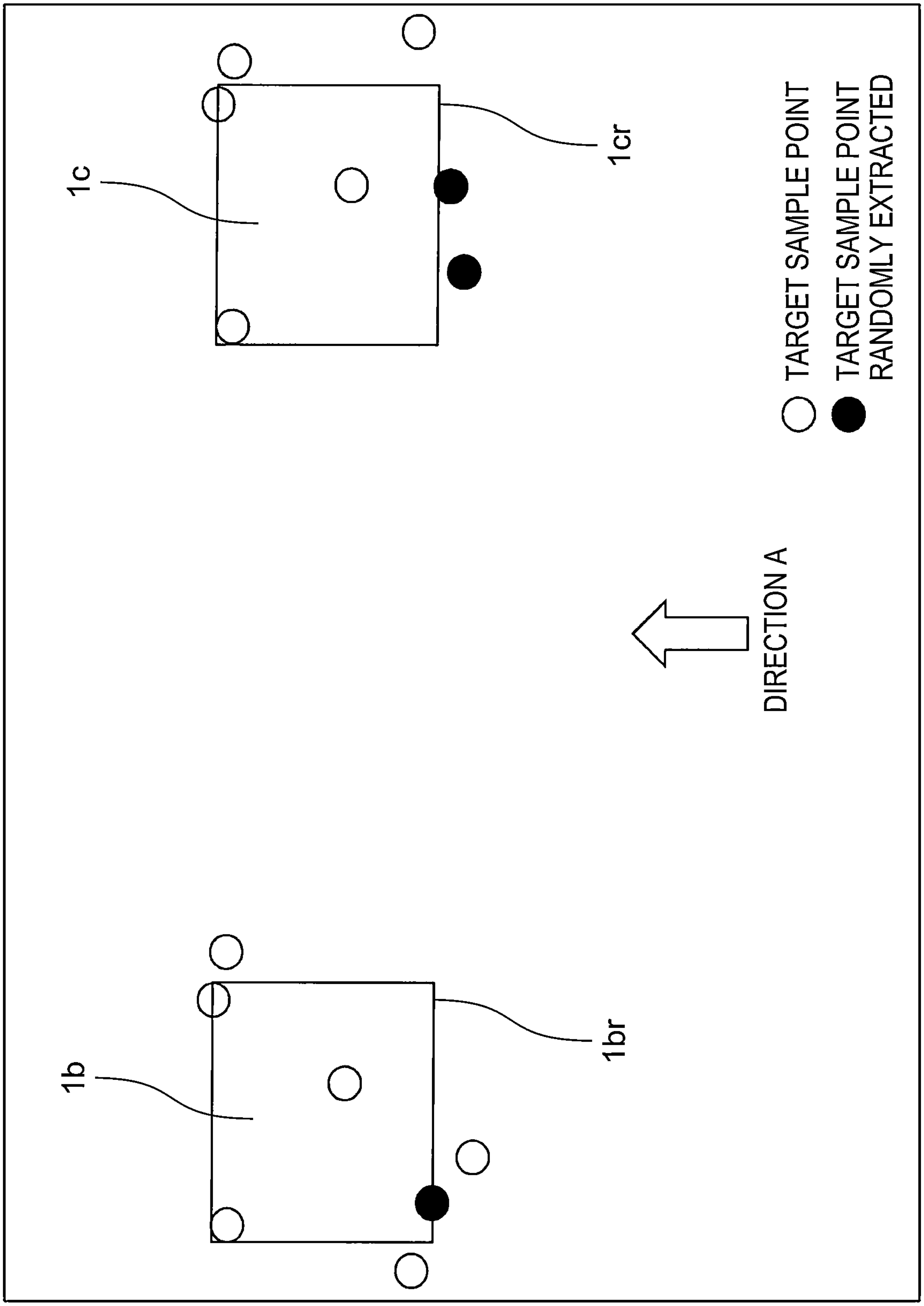
FIG. 14 is a schematic diagram illustrating an action of the plane detecting method.

Next, plane detector 103 randomly extracts at least three target sample points from the plurality of target sample points above in the 3D coordinate information (with reference to random extraction process S11 in FIG. 11 and FIG. 14). For example, the extraction is performed through the RANSAC. In an example of FIG. 14, black circles are the target sample points randomly extracted. In the example of FIG. 14, the number of the target sample points randomly extracted is three.

Here, in the present exemplary embodiment, at least one point is selected from the target sample points belonging to first surface 1*br*, and at least one point is selected from the target sample points belonging to second surface 1*cr* in random extraction process S11. In the example of FIG. 14, one point is selected from the target sample points belonging to first surface 1*br*, and two points are selected from the target sample points belonging to second surface 1*cr* in random extraction process S11.

Figure 15:
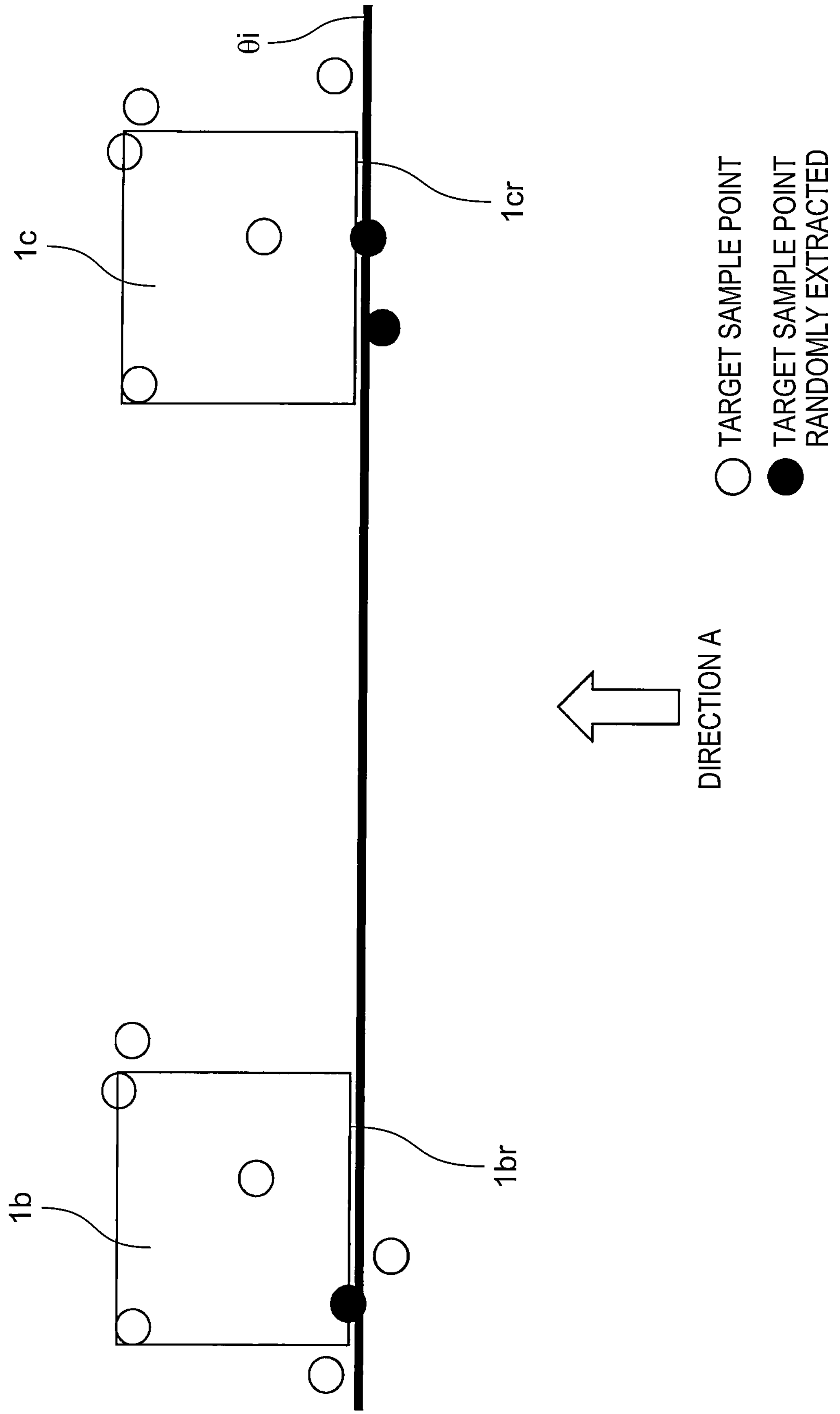
FIG. 15 is a schematic diagram illustrating an action of the plane detecting method.

Next, plane detector 103 obtains plane equation θ (plane θ) based on the three target sample points extracted above by, for example, the RANSAC (with reference to plane equation acquisition process S12 in FIG. 11). For example, here, plane θi is obtained as plane θ. FIG. 15 illustrates plane θi obtained.

Figure 16:
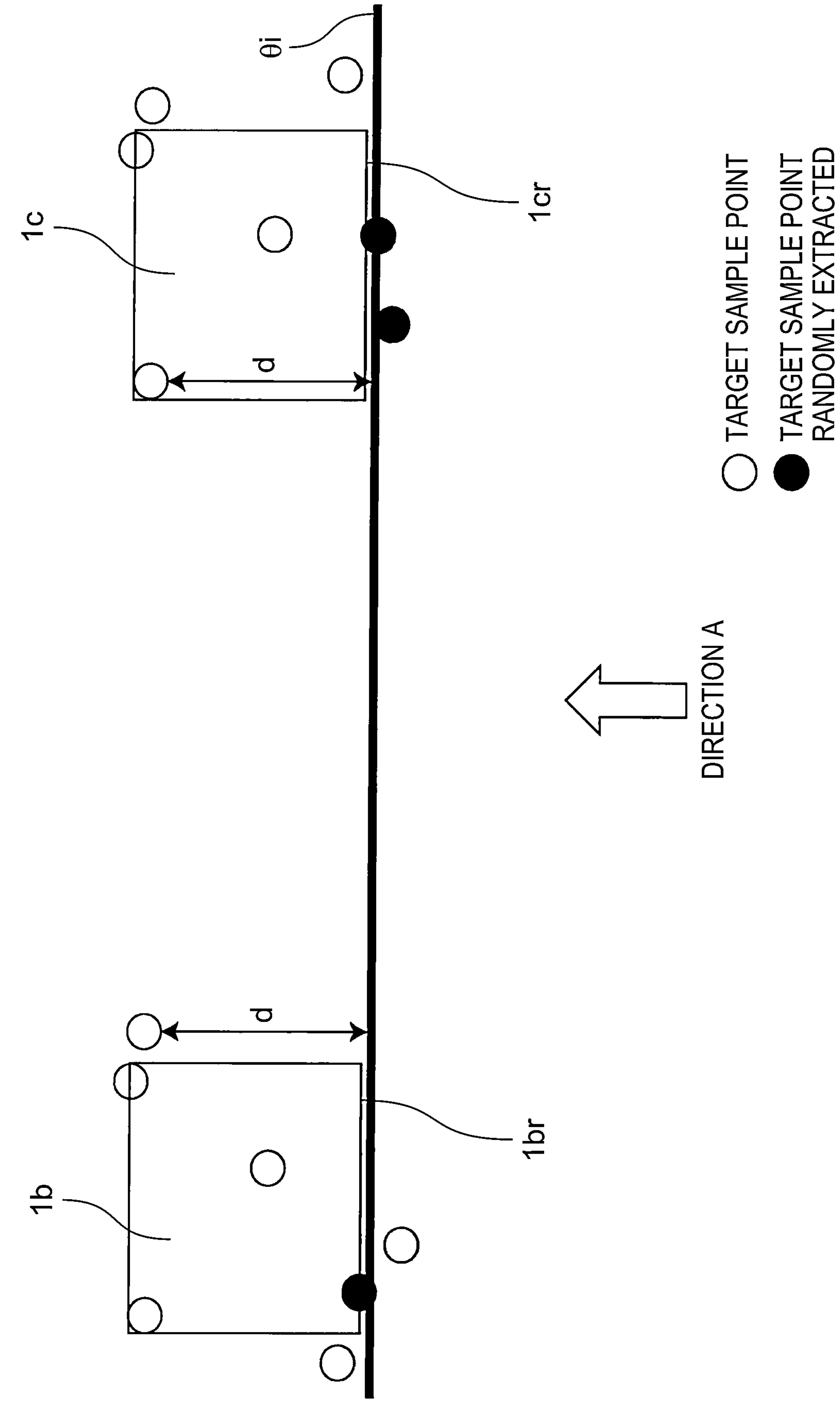
FIG. 16 is a schematic diagram illustrating an action of the plane detecting method.

Next, plane detector 103 obtains a distance from plane θi to the each of the target sample point, respectively (with reference to distance acquisition process S13 in FIG. 11). FIG. 16 illustrates distances d obtained. Note that, in FIG. 16, for simplicity, distances d are illustrated for two target sample points, but plane detector 103 performs a process of obtaining the distances above for all the target sample points.

Figure 17:
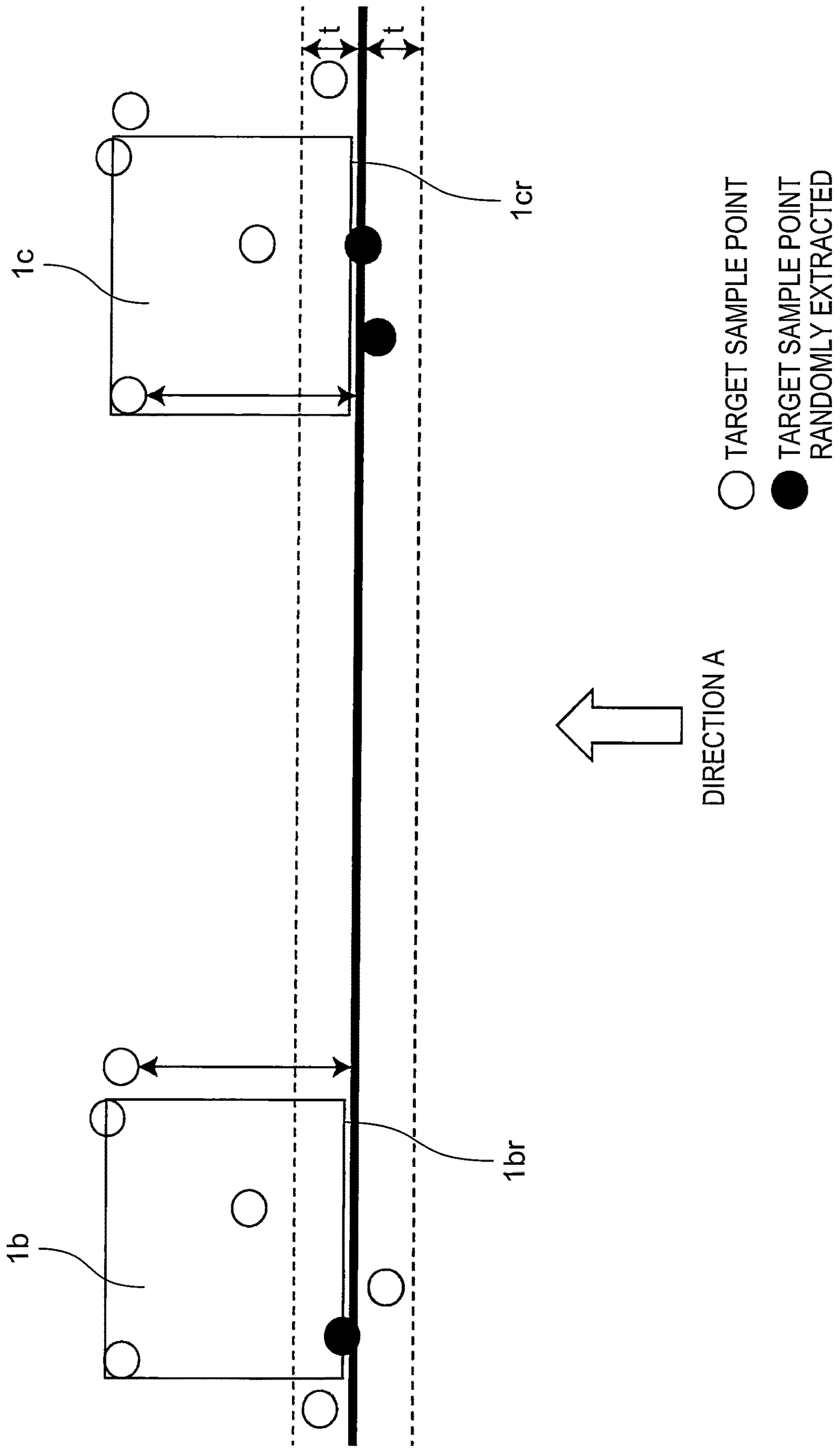
FIG. 17 is a schematic diagram illustrating an action of the plane detecting method.

Next, plane detector 103 extracts the target sample points having distances d obtained above of less than threshold values t from all the target sample points (for example, all the target sample points having the likelihoods of greater than 0) (with reference to FIG. 17). As illustrated in FIG. 17, the distances to threshold values t are indicated by dotted lines. For example, plane detector 103 extracts the target sample points existing in a region surrounded by the dotted lines in FIG. 17. Note that, in the present exemplary embodiment, since "less than threshold values t", the target sample points existing on the dotted lines are not extracted.

The likelihoods are determined for all the target sample points through the likelihood acquisition process described above. Therefore, plane detector 103 obtains likelihood addition value L of all the target sample points having the distances from plane θi of less than threshold values t (with reference to addition value L acquisition process S14 in FIG. 11). For example, in a case of an example of FIG. 17, a total of six target sample points exist in the region surrounded by the dotted lines. Accordingly, plane detector 103 extracts the six target sample points. As the likelihoods, 0.3, 0.4 0.7, 1.0, 1.0 and 1.0 are assigned to a respective one of the target sample points. In this case, plane detector 103 obtains 4.4 as likelihood addition value L.

Next, plane detector 103 compares provisional addition value L' being currently set with likelihood addition value L obtained this time. Then, a larger value is newly set as provisional addition value L' (with reference to provisional value setting process S15 in FIG. 11). Here, as described above, provisional addition value L' being currently set as default is 0. Accordingly, plane detector 103 sets likelihood addition value L obtained this time as a new provisional addition value L'. In a case of an example above, 4.4 is set as the new provisional addition value L' in plane detecting device 10.

Moreover, plane detector 103 newly sets plane θ corresponding to provisional addition value L' newly set as provisional plane θ' in plane detecting device 10 (with reference to provisional value setting process S15 in FIG. 11). In this case, addition value L (=4.4) is determined for plane θi, and addition value L (=4.4) is set as the new provisional addition value L'. Therefore, plane detector 103 newly sets plane θi corresponding to likelihood addition value L (=4.4) obtained above as provisional plane θ' in plane detecting device 10.

In step S3 of FIG. 5, the plane setting loop (with reference to FIG. 11) is performed the predetermined number of times (k times). In FIG. 11, in the case where the plane setting loop ends less than k times (that is, k−1 times), the process returns from provisional value setting process S15 to random extraction process S11, and next, the plane setting loop is performed. In contrast, in the case where the plane setting loop in FIG. 11 ends k times, the plane setting loop (in other words, the plane detection process in step S3 of FIG. 5) ends. Then, in a case where the process of step S3 ends, plane detector 103 outputs provisional addition value L' and provisional plane θ' set during the end as plane detection results. In other words, provisional plane θ' to be output represents an equation relating to the plane detected from the target.

(Description of Effects)

Further, in a sixth aspect of the present exemplary embodiment, pallet 1 includes second strut 1*c* separately from first strut 1*b*. Second strut 1*c* extends from flat plate 1*a* in a direction where the object is stacked (up-down direction in FIG. 12). Further, second strut 1*c* includes second surface 1*cr*. The predetermined plane above has first surface 1*br* and second surface 1*cr*.

Therefore, in a case where pallet 1 has first strut 1*b* and second strut 1*c* extending in a perpendicular direction (object stacking direction) and first surface 1*br* and second surface 1*cr* exist in the same plane, the predetermined plane (plane including first surface 1*br* and second surface 1*cr*) can be detected for pallet 1 as the target.

Further, in a seventh aspect of the present exemplary embodiment, plane detector 103 detects the predetermined plane of pallet 1 through the RANSAC by using a plurality of sample points randomly selected from the 3D coordinate information and the likelihoods each corresponding to a respective one of the plurality of sample points. The plurality of sample points include at least one sample point selected for first surface 1*br* and at least one sample point selected for second surface 1*cr*.

Accordingly, first surface 1*br* and second surface 1*cr* of pallet 1 can be automatically, accurately, and practically detected. Moreover, since first surface 1*br* and second surface 1*cr* are arranged apart from each other, and first surface 1*br* and second surface 1*cr* exist in the same plane, the predetermined plane can be detected at the higher speed and with the higher accuracy as compared with the case of detecting the predetermined plane only for first surface 1*br*.

Although the present invention has been fully described in relation with a preferred exemplary embodiment with reference to the accompanying drawings, various variations and modifications are obvious to a person skilled in the art. It should be understood that, as long as such modifications and corrections do not deviate from the scope of the present disclosure according to the appended claims, such modifications and corrections are included therein.

For example, since a predetermined surface of the pallet can be easily measured with the high accuracy, the present disclosure can be suitable for a transportation field such as stacking of loads on a truck or in a warehouse.

What is claimed is:

1. A plane detecting device comprising:

a camera that captures an image data of a target having a predetermined plane; and a processor that processes the image data;

wherein the processor is configured to function as:

an information acquisition unit that acquires visible image information and 3D coordinate information corresponding to the visible image information from the image data;

a likelihood acquisition unit that acquires likelihoods indicating a planarity of the predetermined plane of the target from the visible image information;

a plane detector that detects the predetermined plane of the target through a robust estimation method by using the 3D coordinate information and the likelihoods; and a storage that stores a machine learning model constructed by machine learning, wherein the likelihood acquisition unit acquires the likelihoods for each pixel from the visible image information by using the visible image information as input information and the machine learning model.

2. The plane detecting device according to claim 1, wherein the target includes a pallet capable of stacking an object.

3. The plane detecting device according to claim 2, wherein the pallet includes:

a flat plate that stacks the object; and a first strut extending from the flat plate in a direction where the object is stacked; and the predetermined plane includes a first surface of the first strut.

4. The plane detecting device according to claim 1, wherein the plane detector detects the predetermined plane of the target through RANSAC by using a plurality of sample points randomly selected from the 3D coordinate information and the likelihoods each corresponding to a respective one of the plurality of sample points.

5. The plane detecting device according to claim 3, wherein the pallet includes a second strut extending from the flat plate in a direction where the object is stacked separately from the first strut;

the second strut includes a second surface; and the predetermined plane has the first surface and the second surface.

6. The plane detecting device according to claim 5, wherein the plane detector detects the predetermined plane of the pallet through the RANSAC by using a plurality of sample points randomly selected from the 3D coordinate information and the likelihoods each corresponding to a respective one of the plurality of sample points; and the plurality of sample points include at least one sample point selected for the first surface and at least one sample point selected for the second surface.

7. A plane detecting method comprising:

acquiring visible image information of a target having a predetermined plane and 3D coordinate information corresponding to the visible image information from an image data of a target captured by a camera;

acquiring likelihoods indicating a planarity of the predetermined plane of the target from the visible image information;

detecting the predetermined plane of the target through a robust estimation method by using the 3D coordinate information and the likelihoods; and storing a machine learning model constructed by machine learning, wherein the acquiring acquires the likelihoods for each pixel from the visible image information by using the visible image information as input information and the machine learning model.

8. A computer-readable recording medium recording a program for causing a computer to execute the method according to claim 7.

* * * * *